(No Model.) 9 Sheets—Sheet 1.
W. P. KIDDER.
TYPE WRITING MACHINE.

No. 464,504. Patented Dec. 8, 1891.

Witnesses.
Lauritz N. Möller.
John R. Snow.

Inventor.
Wellington P. Kidder
by his attorneys,
Maynadier & Beach.

(No Model.) 9 Sheets—Sheet 2.
W. P. KIDDER.
TYPE WRITING MACHINE.
No. 464,504. Patented Dec. 8, 1891.
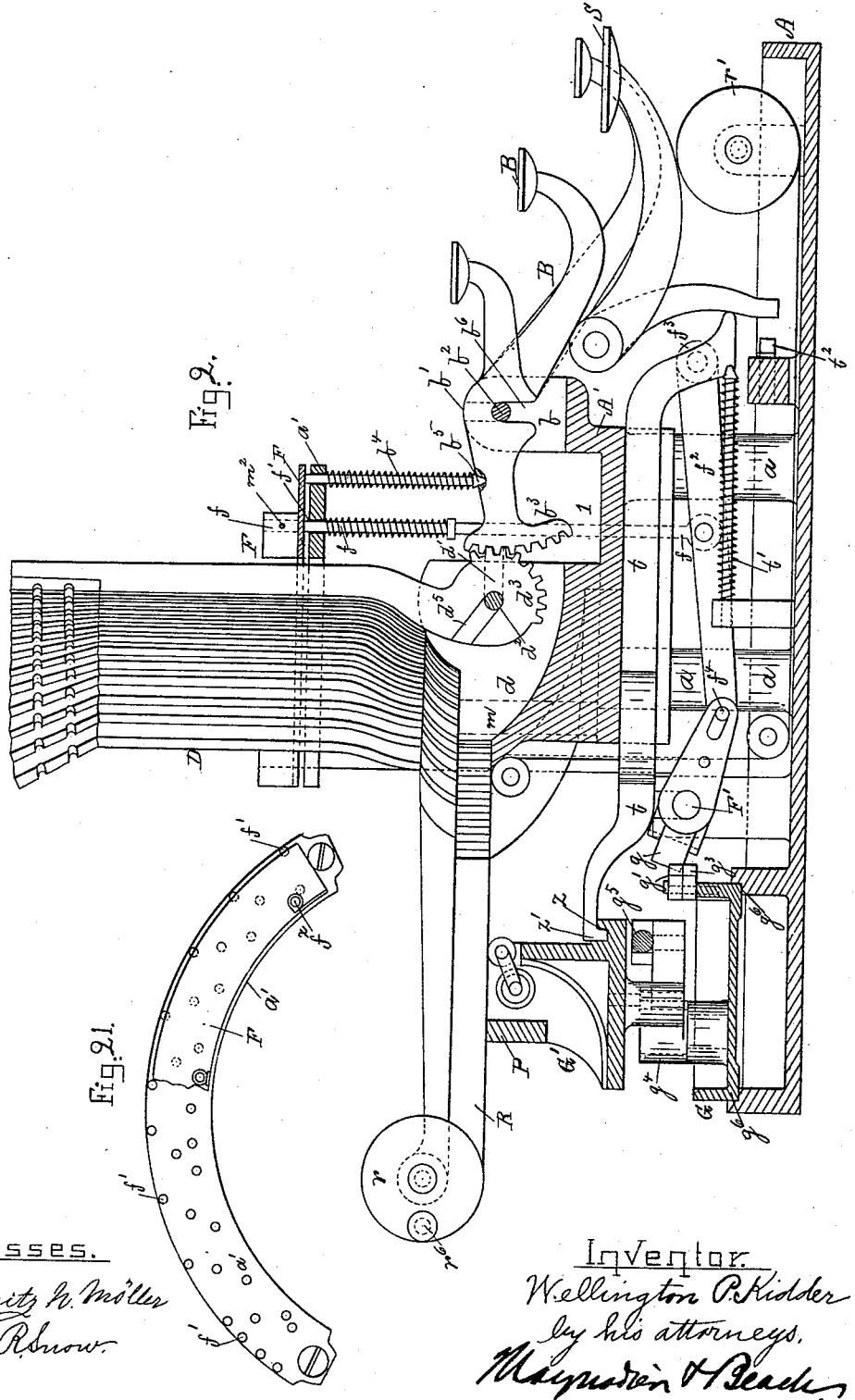

(No Model.) 9 Sheets—Sheet 3.
W. P. KIDDER.
TYPE WRITING MACHINE.
No. 464,504. Patented Dec. 8, 1891.
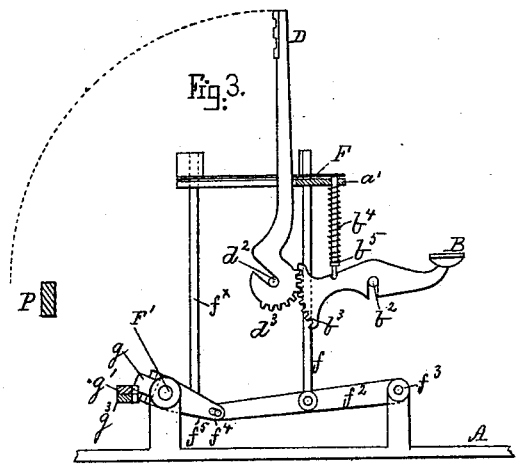
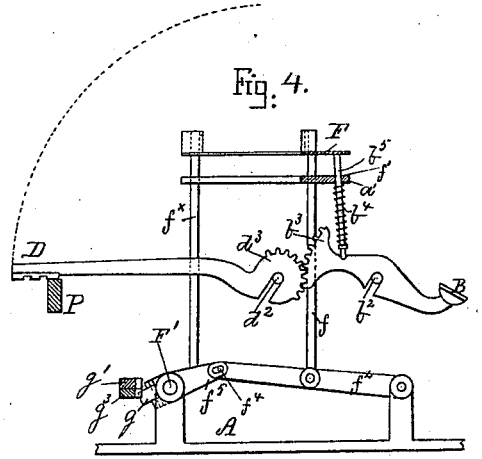
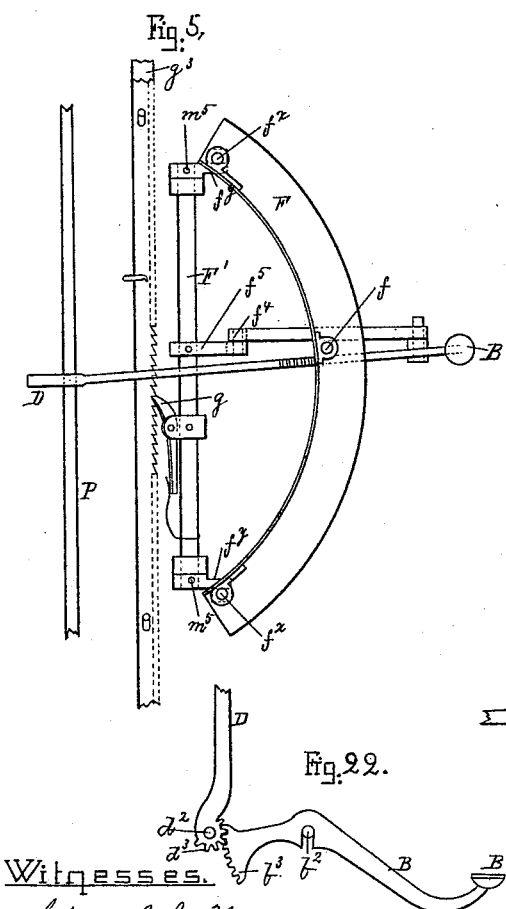
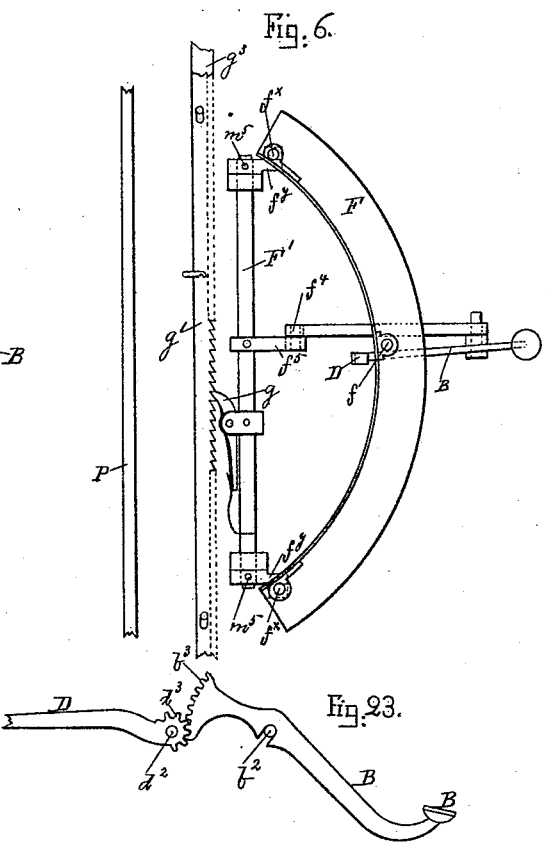
Witnesses.
Lauritz N. Möller.
John R. Snow.
Inventor
Wellington P. Kidder,
by his attorneys,
Maynadier & Beale.

(No Model.) 9 Sheets—Sheet 4.
W. P. KIDDER.
TYPE WRITING MACHINE.
No. 464,504. Patented Dec. 8, 1891.
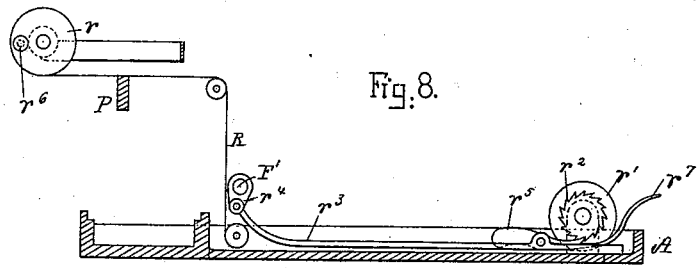
Fig. 8.
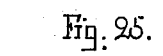
Fig. 25.
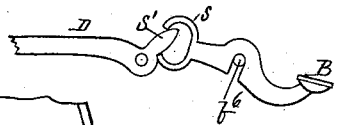
Fig. 9.
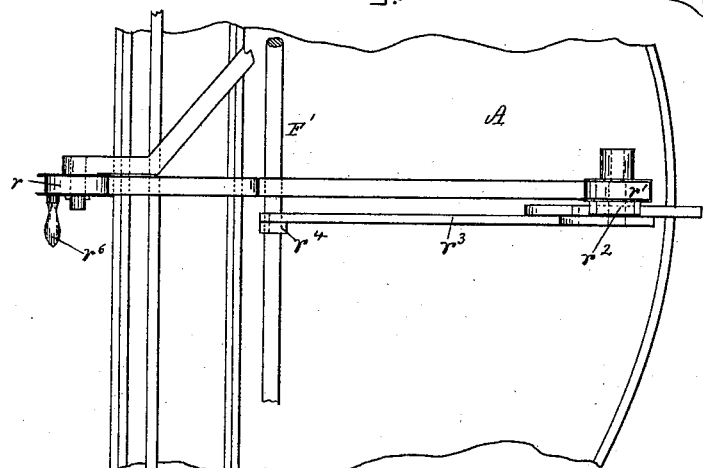
Fig. 26. Fig. 20. Fig. 24.
Witnesses.
Lauritz W. Möller.
John R. Snow.
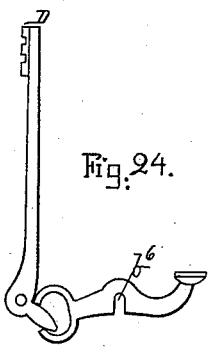
Inventor.
Wellington P. Kidder
by his attorneys,
Maynadier & Beach.

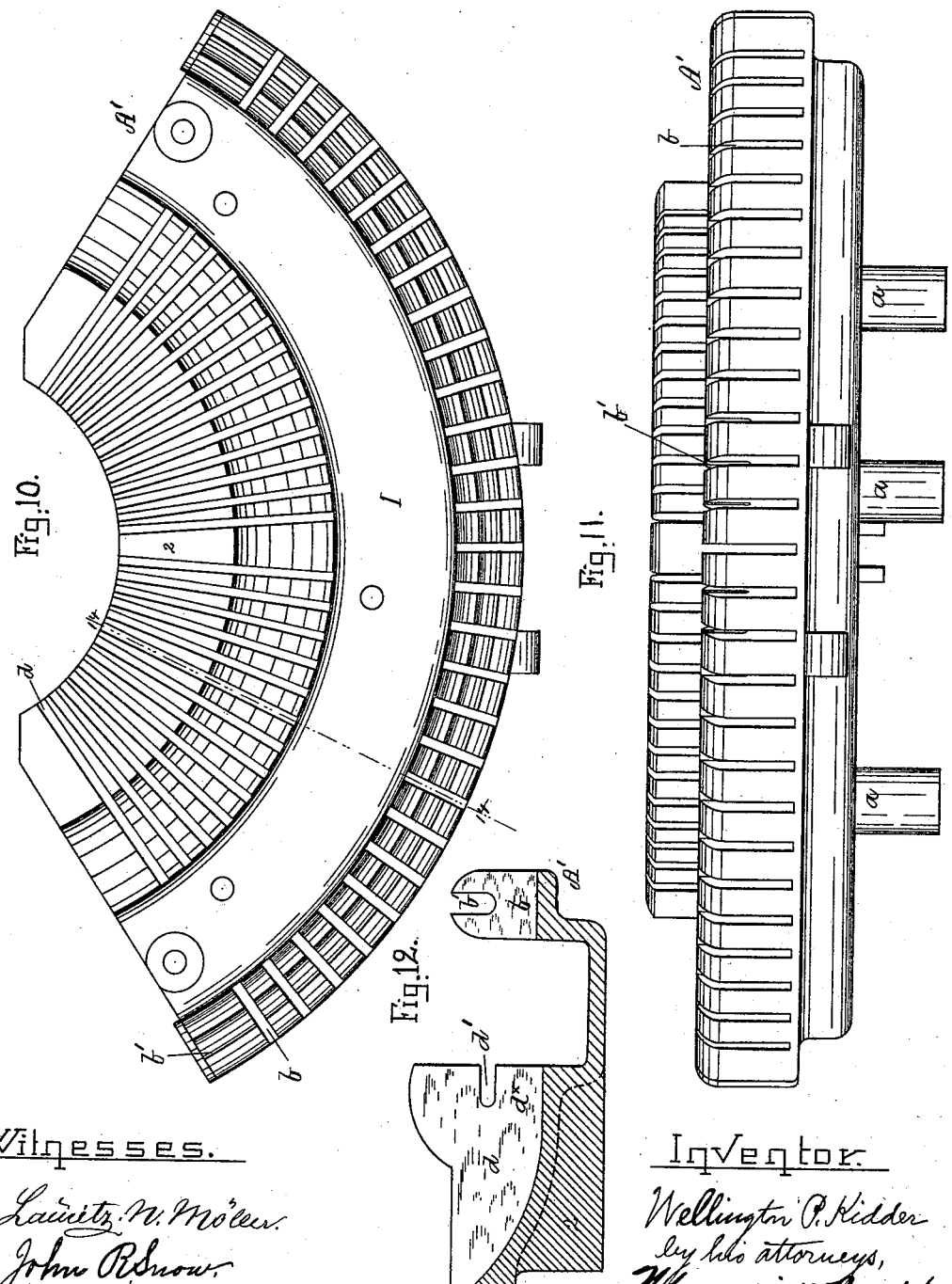

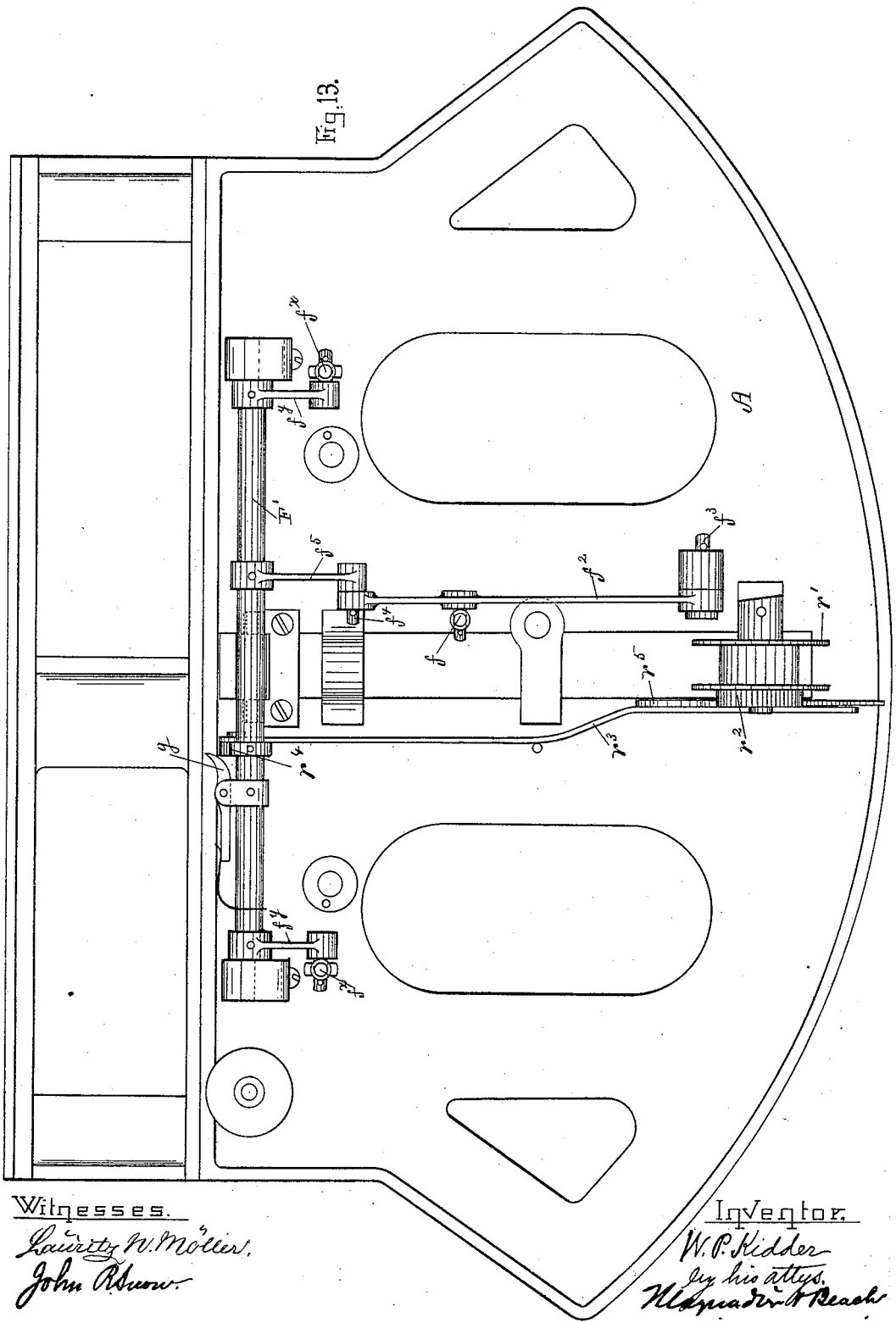

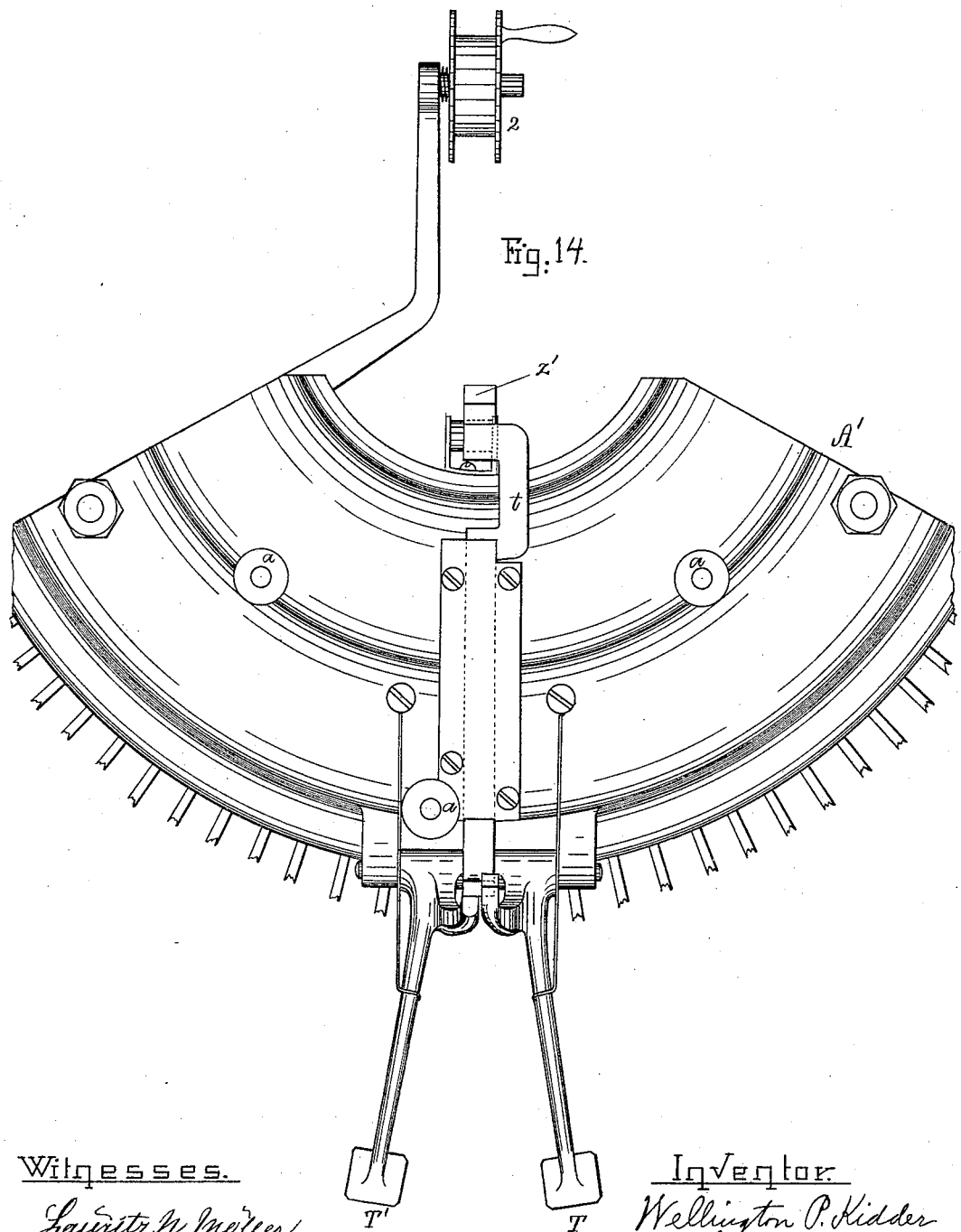

(No Model.) 9 Sheets—Sheet 8.

W. P. KIDDER.
TYPE WRITING MACHINE.

No. 464,504. Patented Dec. 8, 1891.

Witnesses.
Lauritz H. McKeer
John R. Snow

Inventor.
Wellington P. Kidder
by his attorneys,
Maguire & Benr.

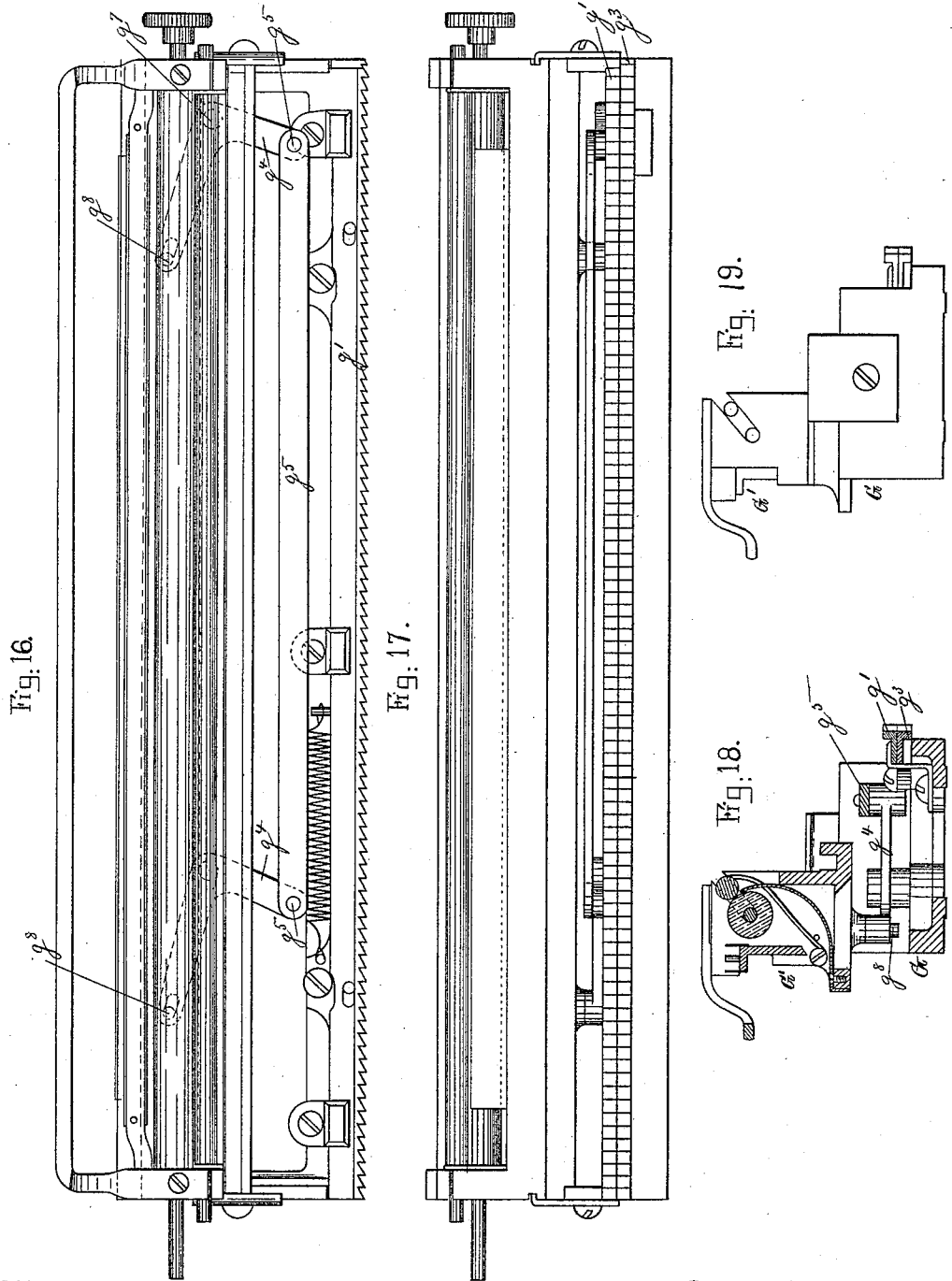

United States Patent Office.

WELLINGTON P. KIDDER, OF BOSTON, MASSACHUSETTS, ASSIGNOR, BY MESNE ASSIGNMENTS, TO THE TILTON MANUFACTURING COMPANY, OF SAME PLACE.

TYPE-WRITING MACHINE.

SPECIFICATION forming part of Letters Patent No. 464,504, dated December 8, 1891.

Application filed August 13, 1889. Serial No. 320,636. (No model.)

*To all whom it may concern:*

Be it known that I, WELLINGTON P. KIDDER, of Boston, in the county of Suffolk, State of Massachusetts, have invented a new and useful Type-Writer, of which the following is a specification, reference being had to the accompanying drawings, in which—

Figure 1:
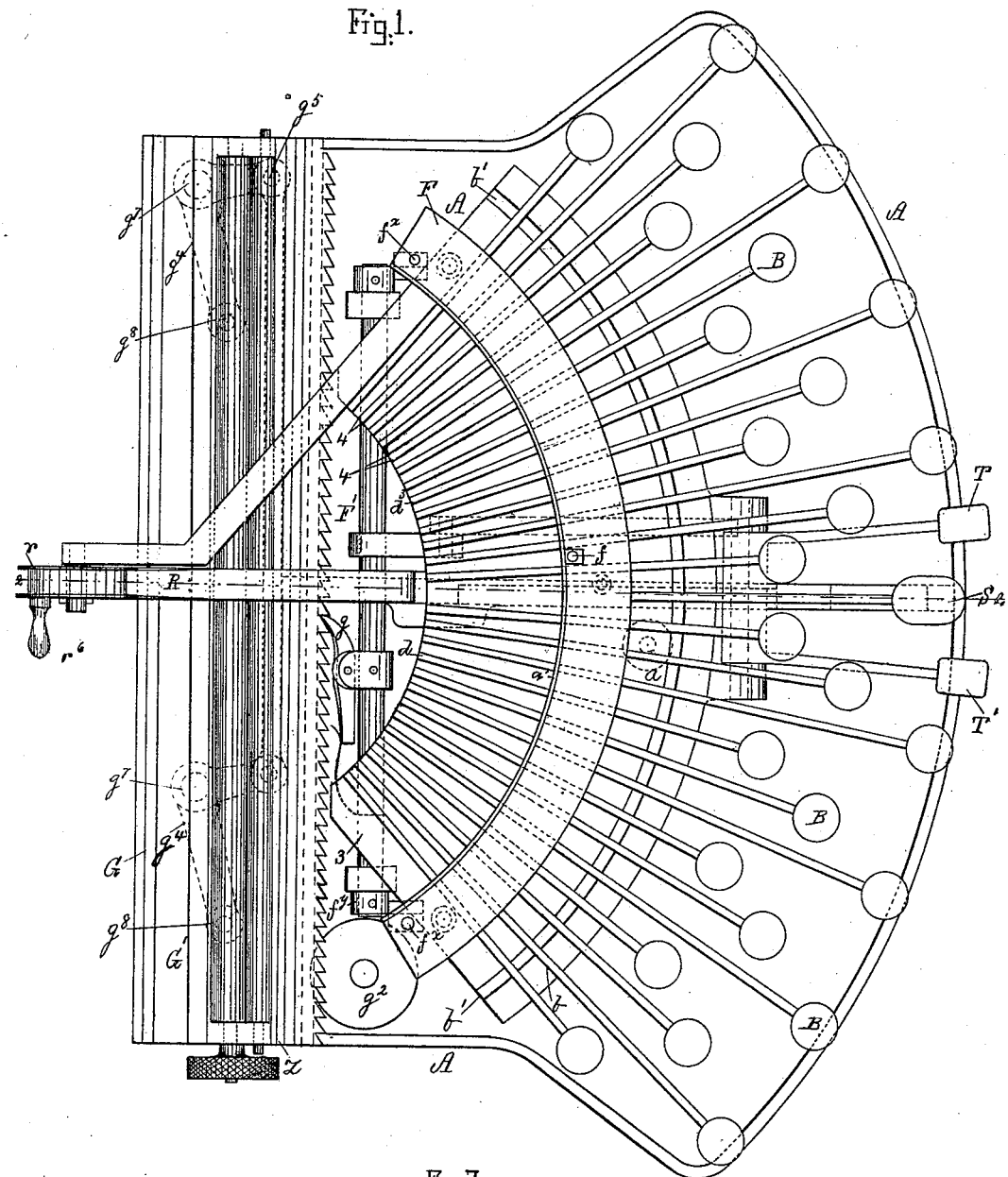
Figure 7:
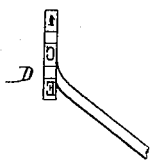
Figure 15:
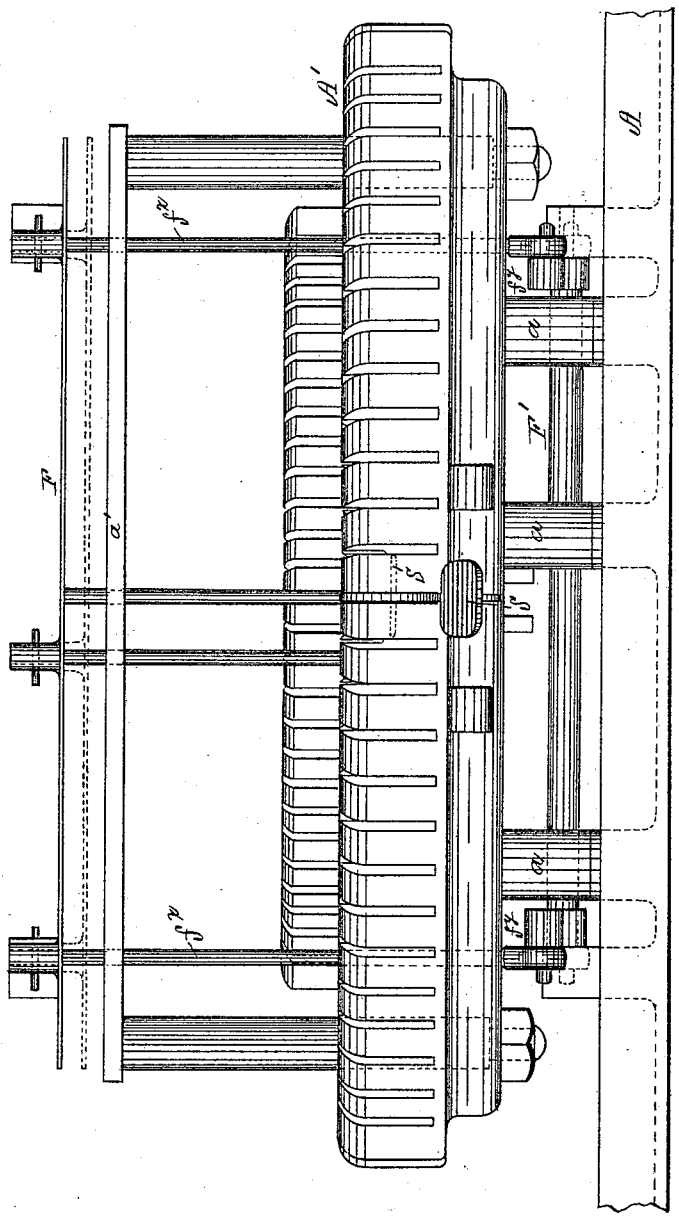

Figure 1 is a plan of one form of type-writer embodying my invention, the type-levers being removed for greater clearness. Fig. 2 is a section on line 2 2 of Fig. 1, looking to the right. Fig. 3 is an elevation showing a type and key-lever meshed together at the inner ends, and also showing other parts described below, the type-lever being in its rearward position. Fig. 4 is a view similar to Fig. 3, except that the key-lever is shown in position to print. Fig. 5 is a plan of what is shown in Fig. 4. Fig. 6 is a plan of what is shown in Fig. 3. Fig. 7 shows type on a type-lever. Fig. 8 is a view, partly in section, showing the ink-ribbon and mechanism for actuating it. Fig. 9 is a plan of what is shown in Fig. 8. Fig. 10 shows plan of the key and type-lever support detached. Fig. 11 is a front elevation thereof. Fig. 12 is a transverse section thereof. Fig. 13 is a plan of the main frame or base of the machine, showing, also, in plan a rocker-shaft carrying a detent for the paper-carriage feed, rods which extend to the reciprocating plate, some members of independent spacing mechanism, and a push-bar for actuating an ink-ribbon spool. Fig. 14 is a bottom plan of the key and type-lever support, showing the connected ink-ribbon spool, a slide-bar for shifting the paper-carriage from and toward the operator, and keys for operating said bar. Fig. 15 is a front elevation of the key and type-lever support, showing a guide-plate and the reciprocating plate connected to a rocker-shaft. Fig. 16 is a top plan of one form of paper-carriage, and Fig. 17 is a front elevation, Fig. 18 is a transverse section, and Fig. 19 an end view, of the same. Fig. 20 shows type and key-levers detached, and Fig. 21 shows perforated guide-plate and reciprocating plates. Figs. 22 to 26 show modifications of the meshed key and type-levers.

The object of my invention is to produce with increased economy of stock and labor a rapid and durable many-keyed type-writing machine which is quickly assembled and adapted for first-class work.

The main feature of my invention is a type-writing machine in which are combined together a series of key-levers, a series of radial type-levers carrying a plurality of types each, and which are at all times meshed at their inner ends with the inner ends of the radial type-levers, a reciprocating plate, a rocker-shaft connected with said plate and connected with an endwise-movable paper-carriage, a series of bars between said reciprocating plate and said key-levers, an endwise-movable paper-carriage, and mechanism for bringing during the printing of any line the paper-carriage and type-levers into such relation with each other that impression of any desired type on any of the type-levers may be had, the whole combination forming an entirety—that is, a complete type-writing machine.

Minor features of my invention are set forth and claimed hereinafter.

In the drawings, in which I show one form of type-writer embodying my invention, and one which I deem the best of the several forms which I have contemplated, A is the base, and A' a support for the key-levers B and type-levers D. This support A' is segmental in form, and is formed by milling or planing a casting to form slots $b$ to receive the key-levers, corresponding slots $d$ to receive the type-levers, cross-groove $d'$ to receive the fulcra of the type-levers D, and a groove $l$, intermediate the cross-grooves $b'$ $d'$, to form a clear space in which the meshed ends of the key and type-levers play. The intermediate groove $l$ is deeper than the key-receiving grooves $b'$ and $d'$, to make room for the inner ends of the key-levers. The slots $b$ and $d$ are in line one with the other. A cross-groove $b'$ cuts slots $b$, and a cross-groove $d'$ cuts slots $d$, the plane of one cross-groove being at an angle to the plane of the other cross-groove. The object of this is to enable each key-lever and its companion type-lever to hold each other in place. Thus in Fig. 2 the cross-groove $b'$ is vertical and the cross-groove $d'$ is horizontal. When assembled, the fulcrum of the key-lever is in the vertical groove $b'$ and the fulcrum of the corresponding type-lever is in the horizontal slot $d'$, and the inner ends of the key and type-levers are meshed directly together, the two levers coacting to retain each other in place, as will be plain from the drawings. The fulcra-receiving grooves $d'$ are enlarged—that is, they are widened out at their inner ends, so as to give a clearance below the fulcra-receiving slot $d'$ to allow the inner toothed end of the type-levers to swing. This will be readily understood by reference to Fig. 12, in which the enlargement referred to is marked $d^x_z$. Base A and frame A' are ordinarily in separate pieces secured together, say, by posts $a$, thus forming a chamber or clear space under frame A' for other mechanism. The grooves $d$ are extended toward the rear of the machine to form a guide 3 to prevent undue lateral vibration of the type-lever as it is moved to the printing-point, thereby securing a clear impression of the type. The type-lever-supporting frame 2 is integral with the frame A', as shown in the drawings, and the guide 3 is also integral with the type-lever-supporting frame, being conveniently formed by extending the sides 4 of the type-lever-receiving slots $d'$ away from the fulcra of the type-levers toward the platen. It will be readily understood that if the type-levers, which are made as light as possible, are not controlled on their sides as they move to the printing-point, there is danger of their vibrating laterally, and consequently of a blurred impression being produced. The fulcra of the key and type levers are conveniently and cheaply formed of rods $b^2$ and $d^2$, on which the levers are mounted and which rest in the fulcra-receiving slots $b'$ $d'$. The frame A' contains, as will now be plain, the type-lever-supporting frame 2, and also the key-lever-supporting frame, and this is a very important matter, as it prevents one frame being moved in relation to the other frame in case of a fall of or blow to the machine, and secures greater certainty and nicety of alignment by securing greater steadiness and nicety of action of the said levers. Each key-lever meshes with its type-lever, the levers being provided at their inner ends with toothed segments $b^3$ and $d^3$, respectively, and consequently the type-levers respond immediately to movement of the key-levers.

It is practically necessary, in order to produce a type-writer capable of doing rapid work, to construct the key-board in such wise that the keys shall have equal motion; for if they do not have equal motion the operator is unnecessarily hindered and fatigued in his work. By equal motion I mean that the key ends of the key-levers have the same range of motion when moved on their fulcra. It is necessary, therefore, for the best results to vary the radii of the segmental gears $b^3$ to correspond to the length of the free ends of the key-levers B—that is, the key-levers in one row or bank differ in length from the key-levers in another row or bank, and in order to give them all equal motion I construct the segmental gears of suitable radii and with a proper number of teeth for accomplishing that purpose.

Type-levers D are mounted radially in supporting-frame A', and each swings to bring the types which it carries into one and the same path or line, which is across the platen P and at an angle to the line to be type-written. Each type-lever ordinarily carries a plurality of types, though of course the number may vary, and it may be desirable in some cases to have a key-lever with but one type.

In the machine shown the paper-carriage G G', hereinafter more fully described, is shiftable in a path crosswise to its lengthwise path in the direction of the type-written line, and in this form of machine the lever-supporting frame A' and parts connected with it are stationary in respect of the carriage, and the carriage and type-lever are therefore brought into relation to each other to obtain an impression of any desired type on any of the type-levers, the carriage being shiftable from and toward the operator to bring the platen into position for any impression.

The depressed key and its connected type-lever are returned to their positions of rest by spring-pressure, and this is conveniently accomplished by means of springs $b^4$, mounted between the key-lever and an auxiliary frame $a'$. This frame $a'$ is a plate supported by posts $m$, rising in this case from support A', and extends from side to side of the machine. It has a series of holes $f'$ through it, and bars $b^5$, resting at their lower ends on the key-levers, pass through these holes, so as to strike against the under surface of plate F, to which the stems $f^x$ and link $f$ are attached. Plate F, like frame $a'$, extends from side to side of the machine, and is directly over frame $a'$. To it the stems $f^x$ and link $f$ are permanently attached, the stems $f^x$ extending downwardly through holes $f'$ in frame $a'$ to rocker-arms $f^y$ on the rocker-shaft F', whereby the rocker-shaft F' is rocked in one direction whenever plate F is lifted and rocked in the opposite direction when plate F moves toward frame $a'$. A link or bar $f$ is also permanently secured to plate F, and extends downwardly through frame $a'$ to a link $f^2$, as hereinafter explained. The stems $f^x$ are conveniently pinned to plate F by pins $m'$ and link $f$ by a pin $m^2$. The rocker-arms $f^y$, to which the stems $f^x$ are journaled at $m^3$, are conveniently secured to the rocker-shaft F' by pins $m^4$. When springs $b^4$ are helical, as shown, the bars $b^5$ keep them in place. The key-lever is depressed against the force of spring $b^4$, and when the finger is removed the key-lever and its connected type-lever are automatically returned to their normal positions. When a key-lever is depressed to cause its type lever to move to the printing-point, a bar $b^5$ is carried through a guide-hole $f'$ against the plate F, which is thereby lifted and rocks the rocker-shaft F' through the stems $f^x$ and rocker-arms $f^y$. Rocker-shaft F', as shown, carries a detent $g$, which engages rack $g'$ on paper-carriage G G'. The paper-carriage is conveniently moved in the direction of the line to be type-written by means of a spring $g^2$ and cord or equivalent device, the escapement or detent operating, as explained below, to prevent the carriage from moving so far as to prevent the impression coming at the proper point. When the key-lever returns to its normal position, the rocker-shaft F' is rocked in the other direction.

While various contrivances may be devised to connect the keys and paper-carriage, I prefer to provide carriage G G' with a stationary rack $g^3$, parallel to which is mounted the spring-controlled sliding rack $g'$. When a type-lever is moved for printing, the detent $g$ engages the stationary rack $g^3$ and holds the carriage stationary. When the type-lever returns, the detent is rocked out of engagement with the stationary rack $g^3$ and into engagement with the sliding rack $g'$, and the carriage is moved by its spring the proper distance for another letter.

In order to move the carriage without using the key-levers, a spacing-key S is provided. This key is mounted like the others; but is not connected to a type-lever. A bar $b^5$ is provided for it and lifts plate F, and thereby lifts link $f$, raising link $f^2$, to which it is connected. Link $f^2$ is loosely pinned at $f^3$ to the frame of the machine, and is connected at its other end by a pin $f^4$ to rocker-arm $f^5$ on the rocker-shaft F', carrying the detent $g$.

Frame A is formed with ways $g^6$, and part G of carriage G G', having rack $g^3$ fixed to it, slides endwise in these ways $g^6$. The part G' of the paper-carriage supports the platen P and feed-rolls, of any suitable construction, and is shiftable over part G of the carriage in a path crosswise to the type-written lines—that is, toward and away from the front of the machine. Part G' has a groove $z$, in which rests the finger $z'$ of slide-bar $t$. The shifting-keys T T' engage sliding bar $t$, which is movable inwardly against the force of spring $t'$. Stops $t^2$ $t^3$ are provided to limit the movements of the shifting-keys. As the sliding bar $t$ has endwise movement only, it is necessary to extend the groove $z$ lengthwise of the carriage, so that the finger $z'$, (on bar $t$,) through resting in the groove $z$, does not interfere with the endwise movement of the paper-carriage.

The preferred means of connecting parts G and G' of the paper-carriage and guiding part G' in its path when it is shifted are the bell-crank levers $g^4$, connected together by a rod $g^5$, fulcrumed to part G at $g^7$ and connected to part G' at $g^8$.

It is very desirable for reasons well known to operators on type-writing machines that the printed characters should come into view as fast as printed, and I accordingly mount the ribbon R at right angles to the type-written lines, the ribbon running from spool $r$ to spool $r'$ across the platen P. It is important to pull the ribbon across the platen a short distance at each impression, and I accomplish this by connecting a ratchet $r^2$ on the spindle of spool $r'$ to rocker-shaft F' by a rod $r^3$ and rocker-arm $r^4$. A pawl $r^5$ is pivoted to rod $r^3$ and engages the ratchet $r^2$. Rocker-shaft F' is a part of the spacing mechanism, (as above explained,) and consequently the spool $r$ is turned whenever the rocker-shaft is actuated. One of the spindles of the spools—say that of spool $r$—is provided with a crank $r^6$, and the pawl for the other spool, in this case $r'$, is provided with an extension $r^7$, by means of which the pawl is readily thrown out of engagement with the ratchet, thereby allowing the operator to rewind the ribbon.

The levers B and D above referred to are preferably formed with segmental gears $b^3$ $d^3$, respectively, at their inner ends. Lever B is conveniently formed with a fulcrum-receiving slot $b^6$ and lever D with a similar slot $d^5$, each of which is cut from one edge of the lever toward the axis of the toothed part. By this construction I am enabled to rapidly assemble the key and type levers, first mounting a type-lever on its fulcrum and then meshing with its toothed end the toothed end of the corresponding key-lever and securing the fulcra of the key-lever in place.

Figs. 22 to 26 show modifications of the meshed key and type levers. Figs. 22 and 23 show the same construction, the levers being in different positions. Here the type-lever is provided with two sidewise trunnions forming its fulcrum $d^2$. Figs. 24 and 25 show the inner end of the key-lever B, provided with two curved teeth $s'$, between which projects a tooth $s'$ on the inner end of the type-lever. Fig. 26 shows a key-lever provided with a slot at its inner end, the side walls $s$ of which slot are the equivalent of the teeth, while the type-lever has a sidewise-projecting pin $s'$ playing in the said slot, the pin being the equivalent of the tooth $s'$.

What I claim as my invention is—

1. In a type-writer, the combination of a key-lever, a type-lever, suitable supports therefor, a reciprocating plate and carriage-feeding mechanism, the reciprocating plate being moved in one direction when the key-lever is depressed and then actuating the carriage-feeding mechanism with which it is connected, and the key-lever and type being meshed directly together at their inner ends, substantially as and for the purpose set forth.

2. In a type-writer, the combination of a paper-carriage, a series of type-levers D, carrying a plurality of type each, a series of key-levers B, meshed at all times at their inner ends with the inner ends of the type-levers, a reciprocating bar $t$ to bring the type-levers and paper-carriage into relation one with the other to obtain a desired impression, and a reciprocating plate F, connected with the carriage-feeding mechanism and moved when a key-lever is moved, all substantially as and for the purpose set forth.

3. In a type-writer, support A', formed with slots $b$ and $d$ in line one with the other, slots $b'$ and $d'$, cutting slots $b$ and $d$, respectively, and a groove $l$ intermediate of the slots $b$ and $d$ and deeper than slots $b$ and $d$ to permit the play of the meshing ends of type and key levers mounted in said support, that part of support A' formed with slots $b$ $b'$ being in substantially the same horizontal plane as that part formed with slots $d$ $d$, all substantially as and for the purpose set forth.

4. In a type-writer, support A', formed with slots $b$ and $d$ in line one with the other and slots $b'$ and $d'$ cutting slots $b$ and $d$, respectively, the plane of slot $b'$ being at an angle to the plane of slot $d'$, substantially as and for the purpose set forth.

5. In a type-writer, support A', formed with slots $b$ and $d$ in line one with the other and slots $b'$ and $d'$ cutting slots $b$ and $d$, respectively, the plane of slot $b'$ being at an angle to the plane of slots $d$, in combination with a series of type-levers fulcrumed in slots $d'$, the sides of the type-levers being between the side walls of slots $d$, and a series of key-levers fulcrumed in slots $b'$, the sides of the key-levers being between the side walls of slots $b$, all substantially as and for the purpose set forth.

6. In a type-writer, a series of key-levers and their companion type-levers, each carrying a plurality of types, in combination with supports for said levers, the support for the key-levers having slots in which the key-levers lie and a cross-slot in which the fulcra of the key-levers lie, the support for the type-levers having slots in which the type-levers lie and a cross-slot in which the fulcra of the type-levers lie, in combination with a two-part paper-carriage, both parts thereof traveling in the direction of the line to be written and one part thereof being shiftable during the printing of any line from and toward the front of the machine, substantially as and for the purpose set forth.

7. In a type-writer, a series of key-levers, a series of type-levers carrying a plurality of type each, and a paper-carriage, the key-levers and type-levers being meshed together at their inner ends, all the type-levers swinging into the same lines, combined with a two-part paper-carriage, a reciprocating plate actuated by the key-levers and actuating the endwise feed of the carriage, both parts of the carriage traveling in the direction of the line to be printed and one part thereof being shiftable from and toward the front of the machine, all substantially as and for the purpose set forth.

8. In a type-writer, a key-lever and its companion type-lever meshed together at their ends, in combination with a support to receive the fulcra and portions of the bodies of the levers, the levers and their fulcra being held in place by engagement of the levers at their inner ends and by projection of walls of the fulcra-receiving slots over the fulcra, substantially as and for the purpose set forth.

9. In a type-writer, the combination of a key-lever, its companion type-lever, and a slotted support for said levers, the walls of the type-lever slots being extended from the type-lever fulcra toward the platen to steady and guide the type-lever when it is swung to the printing-point, all substantially as and for the purpose set forth.

10. In a type-writer, the combination of a series of key-levers with a series of type-levers, the key and type levers being meshed together at their inner ends, the inner ends of each pair of meshed levers being so proportioned and so arranged in relation to every other pair of meshed levers that the key-levers move the same distance when they are depressed to swing the type-levers to the printing-point, substantially as and for the purpose set forth.

11. In a type-writer, a sectional paper-carriage and means to move it endwise, in combination with a reciprocating bar, a spring compressed by said bar when the bar slides in one direction, and a key to slide the bar and compress the spring, the bar engaging one section of the carriage and moving that section sidewise, all substantially as and for the purpose set forth.

12. In a type-writer, the combination of a paper-carriage having a groove $z$ extending lengthwise of it, and a reciprocating slide-bar $t$, having a finger $z'$ in groove $z$, substantially as and for the purpose set forth.

13. In a type-writer, a paper-carriage, a track therefor, and means to move the paper-carriage endwise on its track, in combination with reciprocating slide-bar $t$, the paper-carriage being formed of two parts G G', the part G' having a lengthwise groove $z$ to receive the finger $z'$ on slide-bar $t$ and being movable in a path crosswise to the track, all substantially as described.

14. In a type-writer, a paper-carriage and means to move it endwise, in combination with rocker-shaft F', having rocker-arms $f^y$, stems $f^x$, connected to plate F, plate F, stem $f$, connected to plate F, fulcrumed link $f^2$, rocker-arm $f^5$ on the rocker-shaft, a key-lever, and arbor $b^4$, all substantially as and for the purpose set forth.

15. In a type-writer, a type-lever having a segmental gear $d^3$ at one end and a slot $d^5$ from one edge of the lever inwardly toward the axis of the segmental gear, in combination with a support having a slot to receive the body of the type-lever and a cross-slot to receive the fulcrum of the type-lever, and a key-lever meshed with the type-lever, the key-lever when fulcrumed holding the fulcrum of the type-lever in its slot, substantially as and for the purpose set forth.

16. In a type-writer, the combination of a series of key-levers and type-levers with a series of arbors, a perforated guide-plate $a'$, and a plate F, common to all the arbors, the arbors being interposed between the key-levers and plate F, substantially as and for the purpose set forth.

17. In a type-writer, the combination of a sectional paper-carriage, a track therefor, and means to move it endwise on its track, with a reciprocating slide-bar $t$, a spring $t'$ therefor, and a key, the paper-carriage having a lengthwise groove $z$ to receive a finger $z'$ on slide-bar $t$, all substantially as and for the purpose set forth.

18. In a type-writer, the combination of a paper-carriage with a series of radially-mounted type-levers carrying a plurality of type each and each swinging to the same place, a series of key-levers meshed at their inner ends to the inner ends of the type-levers, type and key lever supports with a space between the fulcra of the levers, in which space the meshed ends of the levers play, a slide-bar and key to operate it to bring the paper-carriage and type-levers into proper relation to each other to secure an impression of any desired type on a type-lever, and means to return the meshed levers to their position of rest after impression, all combined and arranged substantially as and for the purpose set forth.

19. In a type-writer, the combination of a paper-carriage with a series of radially-mounted type-levers carrying a plurality of type each and each swinging to the same place, a series of key-levers meshed at their inner ends to the inner ends of the type-levers, supports for the meshed type-levers and key-levers, said supports being integral to prevent displacement of one in relation to the other and grooved radially to receive the bodies of the levers and cross-grooved to receive the fulcra of the levers, a bar $t$ to bring the carriage and type-levers into several different relations to each other to secure an impression of any desired type on any desired type-lever, and means to return the meshed levers to their position of rest after printing, all substantially as and for the purpose set forth.

20. In a type-writer, the combination of a paper-carriage, a curved key and type-lever support, a curved perforated guide-plate, a curved reciprocating plate in proximity to said guide-plate, a series of key and type levers radially mounted in said support, and a series of bars interposed between said levers and the reciprocating plate and passing through the perforations in the guide-plate, all substantially as and for the purpose set forth.

21. In a type-writer, the combination of a paper-carriage with a key and type lever supporting frame, a series of key-levers, a series of type-levers, said levers being meshed together at their inner ends, a perforated guide-plate, a reciprocating plate, a series of bars interposed between the levers and reciprocating plate and passing through the perforations in the guide-plate, substantially as and for the purpose set forth.

22. In a type-writer, the combination of key and type levers and supports therefor with a reciprocating plate, bars interposed between said plate and the levers, links connecting the plate with a rocker-shaft, and a carriage feed mechanism, all substantially as and for the purpose set forth.

23. A type-writing machine in which there is a series of key and type levers meshed together at all times at their inner ends and mounted in grooves in a support which has a recess between the fulcra of the meshed levers to permit the play of the inner ends of the levers, which swing to a common printing-point, in combination with a carriage and a reciprocating plate moved in one direction when a key-lever is depressed and then actuating carriage-feeding mechanism with which the reciprocating plate is connected, all substantially as and for the purpose set forth.

24. In a type-writer, the combination of a paper-carriage with a key and type lever supporting frame, a series of key and type levers meshed together at their inner ends, said key and type levers being mounted in said frame, a perforated guide-plate, a series of bars and springs interposed between the meshed keys and said guide-plate, a reciprocating plate engaged by said bars, the type-levers being provided with a plurality of type each, and the carriage and lever carrying frame being adjustable in respect of each other to cause any desired type on a type-lever to print at the desired point, all arranged and operating substantially as and for the purpose set forth.

25. In a type-writer, the combination of a paper-carriage having a fixed rack $g^3$ and a sliding rack $g'$, in combination with means to give the carriage endwise motion, a rocker-shaft F', carrying a detent $g$, stems $f^x$, connected to said rocker-shaft, plate F, connected to said stem, a bar $b^5$, movable toward and away from plate F, and a key to move said bar, all substantially as and for the purpose set forth.

26. In a type-writer, the combination of a paper-carriage having a fixed rack $g^3$ and a sliding rack $g'$, in combination with means to give the carriage endwise movement, a rocker-shaft F', a detent $g$, a rocker-arm $f^5$, fulcrumed link $f^2$, connected with rocker-arm $f^5$ on rocker-shaft F', link $f$, plate F, bar $b^5$, and a key to move the bar, the detent being on the rocker-shaft which is rocked when plate F is raised by bar $b^5$ and its key to carry detent $g$ from the fixed rack to the movable rack, substantially as and for the purpose set forth.

27. In a type-writer, the combination of a series of key-levers B and type-levers D, with supports therefor, having slots $b$ and $d$ in line one with the other, slots $b'$ and $d'$, slots $b'$ and $d'$ cutting slots $b$ and $d$, respectively, and having also a groove $l$, intermediate slots $b$ and d, the fulcra of the key-levers being in slots b, the fulcra of the type-levers D being in slots d, and the inner ends of the said levers meshing together, substantially as and for the purpose set forth.

28. The improved type-writer herein described, made up of a series of key and type levers meshed together at their inner ends, some or all the type-levers carrying a plurality of type each, supports for said levers, a paper-carriage, means to move it endwise, a bar to bring the paper-carriage and type-levers into several relations with each other to obtain impression of any desired type on a type-lever, and a spring to return each pair of the meshed levers to position after impression, all combined substantially as and for the purpose set forth.

WELLINGTON P. KIDDER.

Witnesses:
EDWARD S. BEACH,
H. C. YOUNG.